(12) United States Patent
Fertig et al.

(10) Patent No.: US 12,606,146 B2
(45) Date of Patent: Apr. 21, 2026

(54) METHOD FOR DETERMINING A PRESSURE-VOLUME CHARACTERISTIC CURVE OF A BRAKE CALIPER DEVICE

(71) Applicant: AUMOVIO Germany GmbH, Frankfurt am Main (DE)

(72) Inventors: Felix Alexander Fertig, Frankfurt am Main (DE); Eberhard Münz, Sandhausen (DE); Thorsten Wickenhöfer, Hofheim (DE); Michael Wintzer, Frankfurt (DE); Manuel Nesensohn, Griesheim (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 0 days.

(21) Appl. No.: 18/715,292

(22) PCT Filed: Nov. 14, 2022

(86) PCT No.: PCT/DE2022/200266
§ 371 (c)(1),
(2) Date: May 31, 2024

(87) PCT Pub. No.: WO2023/098957
PCT Pub. Date: Jun. 8, 2023

(65) Prior Publication Data
US 2025/0033625 A1 Jan. 30, 2025

(30) Foreign Application Priority Data
Dec. 2, 2021 (DE) .................... 10 2021 213 710.5

(51) Int. Cl.
*B60T 17/22* (2006.01)
*B60T 13/66* (2006.01)

(52) U.S. Cl.
CPC .......... *B60T 17/221* (2013.01); *B60T 13/662* (2013.01); *B60T 2270/406* (2013.01); *B60T 2270/88* (2013.01)

(58) Field of Classification Search
CPC .... B60T 17/221; B60T 13/662; B60T 13/686; B60T 2270/88; B60T 2270/406; B60T 8/34
(Continued)

(56) References Cited

U.S. PATENT DOCUMENTS

| | | | |
|---|---|---|---|
| 11,312,347 B2 * | 4/2022 | Chang | ..................... B60T 8/171 |
| 12,384,350 B2 * | 8/2025 | Luka | ....................... B60T 8/885 |

(Continued)

FOREIGN PATENT DOCUMENTS

| | | | |
|---|---|---|---|
| CN | 104108389 A | * 10/2014 | ............ B60T 13/745 |
| CN | 105004535 A | 10/2015 | |

(Continued)

OTHER PUBLICATIONS

Search dated Mar. 28, 2025 from corresponding Japanese patent application No. 2024-530527.
(Continued)

*Primary Examiner* — Hai H Huynh

(57) ABSTRACT

A method for determining a pressure-volume characteristic curve of a brake caliper device is disclosed. The pressure-volume characteristic curve is formed from a number of pressure-volume data pairs, wherein in each pressure-volume data pair a pressure interpolation value is assigned to a volume interpolation value. The aim is to provide a method for the automated determination of the pressure-volume characteristic curve which can reduce inaccuracies of the pressure-volume characteristic curve because of wear and manufacturing tolerances of the brake caliper device. This is achieved by the volume interpolation value being deter-
(Continued)

mined by utilizing a compensation calculation on a number of auxiliary pressure-volume data pairs.

10 Claims, 2 Drawing Sheets

(58) Field of Classification Search
USPC ...................................................... 701/70, 78
See application file for complete search history.

(56) References Cited

U.S. PATENT DOCUMENTS

2015/0166024 A1* 6/2015 Biller .................... B60T 8/4081
 701/93
2016/0052500 A1 2/2016 Foitzik et al.

FOREIGN PATENT DOCUMENTS

| | | | | | |
|---|---|---|---|---|---|
| DE | 102009028542 A1 | | 2/2011 | | |
| DE | 102011006623 A1 | * | 10/2012 | ............ | B60T 13/741 |
| DE | 102014216843 A1 | * | 2/2016 | ............ | B60T 17/221 |
| DE | 102015204764 A1 | | 9/2016 | | |
| DE | 102016219735 A1 | | 4/2018 | | |
| JP | 2005505470 A | | 2/2005 | | |
| JP | 2013501671 A | | 1/2013 | | |
| KR | 20200107686 A | | 9/2020 | | |
| KR | 1020200107686 A | | 9/2020 | | |

OTHER PUBLICATIONS

Notice of Reasons for Refusal delivered on Apr. 16, 2025 from corresponding Japanese patent application No. 2024-530527.

Search Report dated Aug. 1, 2022 from corresponding German patent application No., 10 2021 213 710.5.

International Search Report and Written Opinion dated Feb. 21, 2023 from corresponding International patent application No. PCT/DE2022/200266.

European Examination Report dated Sep. 2, 2025 for the counterpart European Patent Application No. 22 812 427.7 and machine translation of same.

Korean Office Action dated Sep. 30, 2025 for the counterpart Korean Patent Application Number 10 2024 7015254 and machine translation of same.

Decision to Grant a Patent mailed on Oct. 22, 2025 for the counterpart Japanese Patent Application No. 2024 530527 and machine translation of same.

* cited by examiner

METHOD FOR DETERMINING A PRESSURE-VOLUME CHARACTERISTIC CURVE OF A BRAKE CALIPER DEVICE

CROSS-REFERENCE TO RELATED APPLICATION

This application is a national stage application, filed under 35 U.S.C. § 371, of International Patent Application No. PCT/DE2022/200266, filed on Nov. 14, 2022, which claims priority to German Patent Application No. 10 2021 213 710.5, filed on Dec. 2, 2021, each of which is incorporated by reference.

TECHNICAL FIELD

The technical field relates to a method for determining a pressure-volume characteristic curve of a brake caliper device.

BACKGROUND

A brake caliper device can be used, for example, in a motor vehicle. The behavior of the brake caliper device in a braking process of the motor vehicle is described for hydraulic pressure control by way of the pressure-volume characteristic curve. This indicates a volume in dependence on a pressure. The pressure-volume characteristic curve thus specifies which volume must be displaced into a brake caliper of the brake caliper device in order to generate a desired pressure on a brake piston of the brake caliper of the brake caliper device.

The pressure-volume characteristic curve is conventionally determined here manually on the basis of a number of pressure-volume data pairs. For example, ten pressure-volume data pairs are thus manually applied with the aid of external measuring devices in the brake caliper device to determine the pressure-volume characteristic curve. On the one hand, this manual application of the pressure-volume characteristic curve involves a great deal of effort. It is time-consuming, error-prone and possibly keeps having to be repeated. On the other hand, manual application also cannot accommodate possible individual variation and a change in the pressure-volume characteristic curve over the lifetime of the brake caliper device.

The manual determination of the pressure-volume characteristic curve is typically performed as part of a development project for a predetermined type of brake caliper device. In this brake caliper device, the pressure-volume characteristic curve is then clearly defined toward the end of the development project on the basis of the applied pressure-volume characteristic curve of the measured brake caliper device or specifications within the development project. However, for a number of brake caliper devices of the same design, such a pressure-volume characteristic curve may vary because of manufacturing tolerances. As a result, the accuracy of the pressure-volume characteristic curve may then turn out to be worse during operation of the brake caliper device than was determined during the development project.

In addition, after the development project, there is also wear of a brake pad and a brake disk of the brake caliper device during the operation of the brake caliper device. This in turn also changes the pressure-volume characteristic curve; the volume uptake of the brake caliper typically decreases (i.e. the stiffness of the brake caliper increases).

Additional inaccuracies in the pressure-volume characteristic curve occur as the brake caliper device increasingly wears out.

Overall, the described inaccuracies in the pressure-volume characteristic curve cause deteriorations in the quality of the pressure control and also deteriorations in robustness of the brake caliper device. It should also be borne in mind here that the pressure-volume characteristic curve is also used in other parts of the software of a motor vehicle, such as for example in volume-based safety monitors or volume-based control.

As such, it is desirable to present a method for the automated determination of the pressure-volume characteristic curve which can reduce inaccuracies of the pressure-volume characteristic curve because of wear and manufacturing tolerances of the brake caliper device.

SUMMARY

The disclosed method for the automated determination of the pressure-volume characteristic curve is achieved by the volume interpolation value being determined with a compensation calculation on a number of auxiliary pressure-volume data pairs.

The auxiliary pressure-volume data pairs may be predefined. This can eliminate the need for the manual selection of the auxiliary pressure-volume data pairs. Standardization reduces the effort involved in the manual application of the pressure-volume characteristic curve. The determination of the pressure-volume characteristic curve is also automated by performing the compensation calculation on the auxiliary pressure-volume data pairs. This overall simplifies the application of the pressure-volume characteristic curve. The method is thus also suitable for two basic applications. On the one hand, it can be used to perform a calibration of the pressure-volume characteristic curve as part of a development project (end of line, workshop or series application). On the other hand, it can be used to perform an automated adaptation of the pressure-volume characteristic curve in the event of wear of the brake caliper device during operation. Influences of the temperature of a brake fluid of the brake caliper device or of its brake disk can be disregarded here in the determination of the pressure-volume characteristic curve or excluded by carefully selected ambient conditions. This is because these parameters only lead to a temporary change in the pressure-volume characteristic curve compared to wear. Overall, this can counteract the problems of the decrease in control quality as well as the deterioration in the robustness of hydraulic monitors.

It is advantageous here that the auxiliary pressure-volume data pairs in a local vicinity of the pressure interpolation value assigned to the volume interpolation value have auxiliary pressure interpolation values that are smaller and/or greater than the assigned pressure interpolation value.

As part of the method, first a number of pressure-volume data pairs with which the pressure-volume characteristic curve is to be determined are thus selected. For this purpose, for example pressure interpolation values of the pressure-volume characteristic curve are selected and predefined. These pressure interpolation values may cover the entire range of values of the software signal for the pressure of the brake caliper device. The pressure interpolation values may, for example, be selected and defined as 0, 1.25, 2.5, 5, 10, 20, 40, 80, 160, 327 bar. In a next step, the auxiliary pressure interpolation values are then formed for each of these predefined pressure interpolation values. For this purpose, for example ten auxiliary pressure interpolation values may be selected in a local vicinity below a specified pressure interpolation value. In addition or alternatively, a further ten auxiliary pressure interpolation values may be selected in a local vicinity above the specified pressure interpolation value. The local vicinity should as far as possible be tailored here to the immediate proximity of the specified pressure interpolation value. Thus, if for example a pressure interpolation value of 1.25 bar is selected, the local vicinity below this specified pressure interpolation value may be set for example to the pressure interval [0.75 bar, 1.25 bar]. The local vicinity above the specified pressure interpolation value may be in the interval [1.25 bar, 1.75 bar]. These auxiliary pressure-volume data pairs are acquired and stored.

Furthermore, in one embodiment, the compensation calculation determines, using the method of least squares, a regression function on the auxiliary pressure-volume data pairs that indicates the volume as a function of the pressure in the local vicinity.

The determination of the respective volume interpolation value for an assigned pressure interpolation value is performed using the acquired auxiliary pressure-volume data pairs. For this purpose, a regression function on the auxiliary pressure-volume data pairs is determined to filter outliers from the measurement data. This regression function may be determined for example using the method of least squares. For example, it may be a quadratic polynomial. The regression function thus groups together the determined auxiliary pressure-volume data pairs in the best possible way.

It is also advantageous that the volume interpolation value is determined as a function value of the regression function at the location of the assigned pressure interpolation value.

The regression function groups together the determined auxiliary pressure-volume data pairs in the best possible way and can reliably filter out outliers from the measurement data. Therefore, the volume interpolation value for a predefined pressure interpolation value is determined by using as a basis the function value of the regression function at the location of the respective pressure interpolation value. The determination of the pressure-volume characteristic curve is thus less prone to errors overall. The time it takes to determine it can be reduced.

In all of this it is also advantageous that the auxiliary pressure-volume data pairs are measured by means of a sensor device on the brake caliper device and/or are determined by an estimation.

The determination of the pressure-volume characteristic curve theoretically requires pressure build-ups in the brake caliper device of up to and including 327 bar in order to be as accurate as possible. However, this is not possible if only because of the firmness of the brake caliper. It is also not advisable from the point of view of the load cycles (alternating bending stress) to carry out such high pressure build-ups. As a rule, it will therefore only be possible to determine the auxiliary pressure-volume data pairs in a range up to a maximum of 160 bar with the sensor device on the brake caliper device. It is therefore recommended to use auxiliary pressure-volume data pairs up to 160 bar in the calibration of the pressure-volume characteristic curve, since this calibration is more of a static tool for the one-time determination of the pressure-volume characteristic curve. This is not possible however in the adaptation of the pressure-volume characteristic curve to the wear of the brake caliper device, since there the data pairs are obtained from the normal operation of the brake caliper device, in which significantly lower pressures generally prevail. Nevertheless, despite the lack of data from the sensor device, the pressure-volume characteristic curve in both types of operation should be able to map the entire range of pressure interpolation values as far as possible, i.e., for example up to a pressure of 327 bar. For this purpose, the missing sensor data may be supplemented by an estimation of auxiliary pressure-volume data pairs in the pressure ranges not accessible by measurement.

The estimation may be carried out in a linear region of the pressure-volume characteristic curve using an extrapolation of a number of auxiliary pressure-volume data pairs measured in the linear region.

The estimation of the auxiliary pressure-volume data pairs is carried out separately for low and high pressures. The following property of the brake caliper of the brake caliper device is utilized here. In a high pressure range (from about 80 bar), the pressure-volume characteristic curve is almost exclusively determined by the influence of the "stiff" components of the brake caliper (material of the brake caliper housing). This results in an almost linear relationship of the pressure-volume characteristic curve in these high pressure ranges. Therefore, if sensor data into the high pressure range are available, a linear extrapolation of the volume interpolation values that are sought can take place at even higher pressures (for which no measurement data are available) because of the linear relationship.

Alternatively, it is advantageously provided that the estimation is carried out in a non-linear region of the pressure-volume characteristic curve by means of a parallel displacement of an auxiliary pressure-volume characteristic curve from a number of auxiliary pressure-volume data pairs measured in the non-linear region.

This type of estimation is advantageous for the low pressure range. This is because in the low pressure range (up to about 80 bar) the influence of the "soft" components of the brake caliper (seals, brake lining, and the like) prevails. This results in a non-linear relationship for the pressure-volume characteristic curve in this low pressure range; the influences of the soft and the stiff components of the brake caliper are overlaid. Therefore, if only measurement data of the sensor device in the low pressure range are available, these measurement data cannot simply be extrapolated because of the non-linear relationship. However, in this range there may be data already measured from earlier measurements by means of the sensor device (for example in a previous calibration), which form an auxiliary pressure-volume characteristic curve in this range. This auxiliary pressure-volume characteristic curve can then be used in the estimation and displaced parallel by a suitable volume difference to the required (but not measured) data pairs. This allows a pressure-volume characteristic curve to be determined at low pressures and adapted to the wear of the brake caliper device even during operation of the brake caliper device. However, this adaptation should not be noticed by a user of the brake caliper device here. The pressure-volume characteristic curve therefore must not change too much within a short time. For this reason, a maximum learning increment may be used for the adaptation of the pressure-volume characteristic curve, so that the pressure-volume characteristic curve only approaches the actual pressure-volume characteristic curve slowly and not abruptly over several adaptations.

It is advantageous that the pressure-volume characteristic curve is determined in such a way that it has a strictly monotonously increasing progression, and/or a concave progression, and/or that its derivation has only one maximum in the entire range of the pressure interpolation values.

Before the specific pressure-volume characteristic curve can ultimately be used in a brake caliper device, it must be checked whether the specific pressure-volume characteristic curve meets certain mathematical criteria. These criteria are the strictly monotonous progression of the pressure-volume characteristic curve, a maximum deviation of 30% of the pressure-volume characteristic curve over the lifetime of the brake caliper device because of wear, the concave progression of the pressure-volume characteristic curve and that the derivation of the pressure-volume characteristic curve has only one maximum in the entire range of the pressure interpolation values (for example from 0 bar to 327 bar). These criteria can be derived from empirical data on the most common volume consumers (disk brakes, low drag brake calipers, drum brakes and spring consumers).

It is advantageous that the determination of the pressure-volume characteristic curve is carried out during the operation of the brake caliper device and is used to compensate for wear effects of the brake caliper device.

This can ensure a high accuracy of the pressure-volume characteristic curve despite wear in the brake caliper device over its lifetime. Improving the hydraulic control quality as well as the robustness of hydraulic monitors during operation is ensured.

BRIEF DESCRIPTION OF THE DRAWINGS

The properties, features and advantages of the present disclosure that are described above and also the manner in which they are achieved become clearer and more easily understandable in connection with the following description of the embodiments, which are explained in conjunction with the drawings, in which.

DETAILED DESCRIPTION

Figure 1:
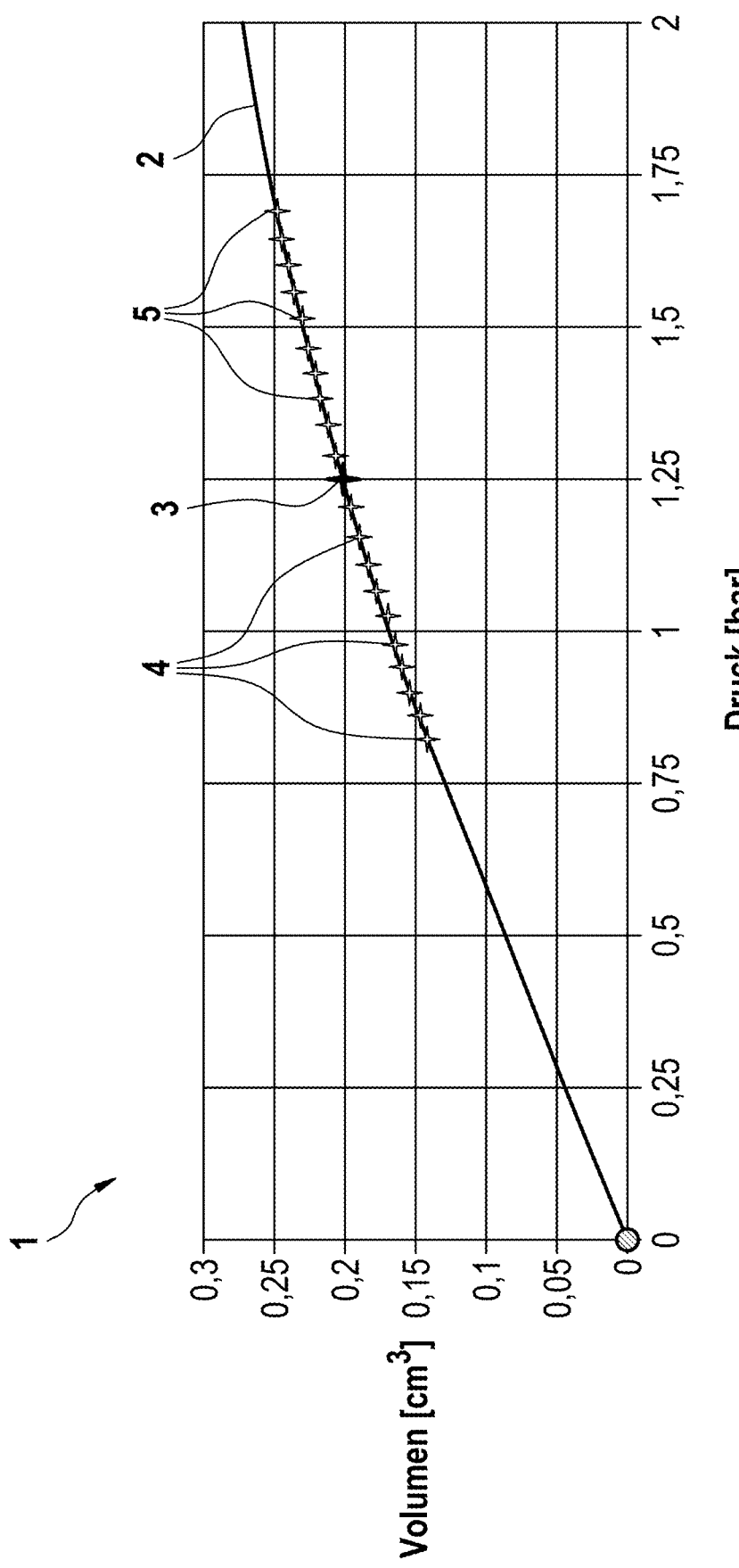
FIG. 1 shows a pressure-volume characteristic curve at a pressure interpolation value with a number of auxiliary pressure-volume data pairs.

In FIG. 1 there is a pressure-volume diagram 1, in which a pressure-volume characteristic curve 2 of a brake caliper device is depicted. This pressure-volume characteristic curve 2 indicates a volume (vertical axis of the pressure-volume diagram 1) in dependence on a pressure (horizontal axis of the pressure-volume diagram 1). The pressure-volume characteristic curve 2 thus specifies which volume must be displaced into a brake caliper of the brake caliper device in order to generate a desired pressure on a brake piston of the brake caliper of the brake caliper device.

To determine the pressure-volume characteristic curve 2, the pressure range is first divided into a number of pressure interpolation values. For example, ten pressure interpolation values may be predefined at 0, 1.25, 2.5, 5, 10, 20, 40, 80, 160, 327 bar that cover the entire range of values of a software signal of the pressure interpolation values for the brake caliper device. In FIG. 1, a local vicinity around a pressure interpolation value of 1.25 bar is shown by way of example. For this pressure interpolation value, a volume interpolation value can then be determined by means of the method. In the example shown, this volume interpolation value lies at 0.2 cm³. The pressure interpolation value together with the volume interpolation value forms a pressure-volume data pair 3.

The pressure interpolation value of 1.25 bar is predefined in the example shown. To determine the associated volume interpolation value of the pressure-volume data pair 3, auxiliary pressure-volume data pairs 4, 5 are used. A first set of auxiliary pressure-volume data pairs 4 is specified here for auxiliary pressure interpolation values below the pressure interpolation value considered of 1.25 bar. These auxiliary pressure interpolation values can be found in a local vicinity of the pressure interpolation value of 1.25 bar in the interval of [0.75 bar, 1.25 bar]. Furthermore, a second set of auxiliary pressure-volume interpolation values 5 is specified for auxiliary pressure interpolation values above the pressure interpolation value considered of 1.25 bar. These auxiliary pressure interpolation values can be found in a local vicinity of the pressure interpolation value of 1.25 bar in the interval of [1.25 bar, 1.75 bar]. The first set of auxiliary pressure-volume data pairs 4 comprises in the example of FIG. 1 ten auxiliary pressure-volume data pairs. The second set of auxiliary pressure-volume data pairs 5 comprises in the example of FIG. 1 ten auxiliary pressure-volume data pairs. To filter outliers in the measurement data, in the example shown a quadratic polynomial placed through the auxiliary pressure-volume data pairs 4, 5 as a regression function has been calculated by means of the method of least squares. The stored auxiliary pressure-volume data pairs 4, 5 are thus grouped together in the best possible way. The calculated polynomial is then used to determine the volume interpolation value of 0.2 cm³ for the specified pressure interpolation value of 1.25 bar. The determination of the pressure-volume characteristic curve 2 is thus less prone to errors overall. The time it takes to determine it can be reduced.

The determination of the pressure-volume characteristic curve 2 theoretically requires pressure build-ups in the brake caliper device of up to and including 327 bar in order to be as accurate as possible. However, this is not possible if only because of the firmness of the brake caliper. It is also not advisable from the point of view of the load cycles (alternating bending stress) to carry out such high pressure build-ups. As a rule, it will therefore only be possible to determine the auxiliary pressure-volume data pairs 4, 5 in a range up to a maximum of 160 bar with the sensor device on the brake caliper device. It is therefore recommended to use auxiliary pressure-volume data pairs 4, 5 up to 160 bar in the calibration of the pressure-volume characteristic curve 2, since this calibration is more of a static tool for the one-time determination of the pressure-volume characteristic curve 2. This is not possible however in the adaptation of the pressure-volume characteristic curve 2 to the wear of the brake caliper device, since there the data pairs are obtained from the normal operation of the brake caliper device, in which significantly lower pressures generally prevail. Nevertheless, despite the lack of data from the sensor device, the pressure-volume characteristic curve 2 in both types of operation should be able to map the entire range of pressure interpolation values as far as possible, i.e. for example up to a pressure of 327 bar. For this purpose, the missing sensor data may be supplemented by an estimation of auxiliary pressure-volume data pairs 4, 5 in the pressure ranges not accessible by measurement. The estimation of the auxiliary pressure-volume data pairs 4, 5 is carried out separately for low and high pressures.

Figure 2:
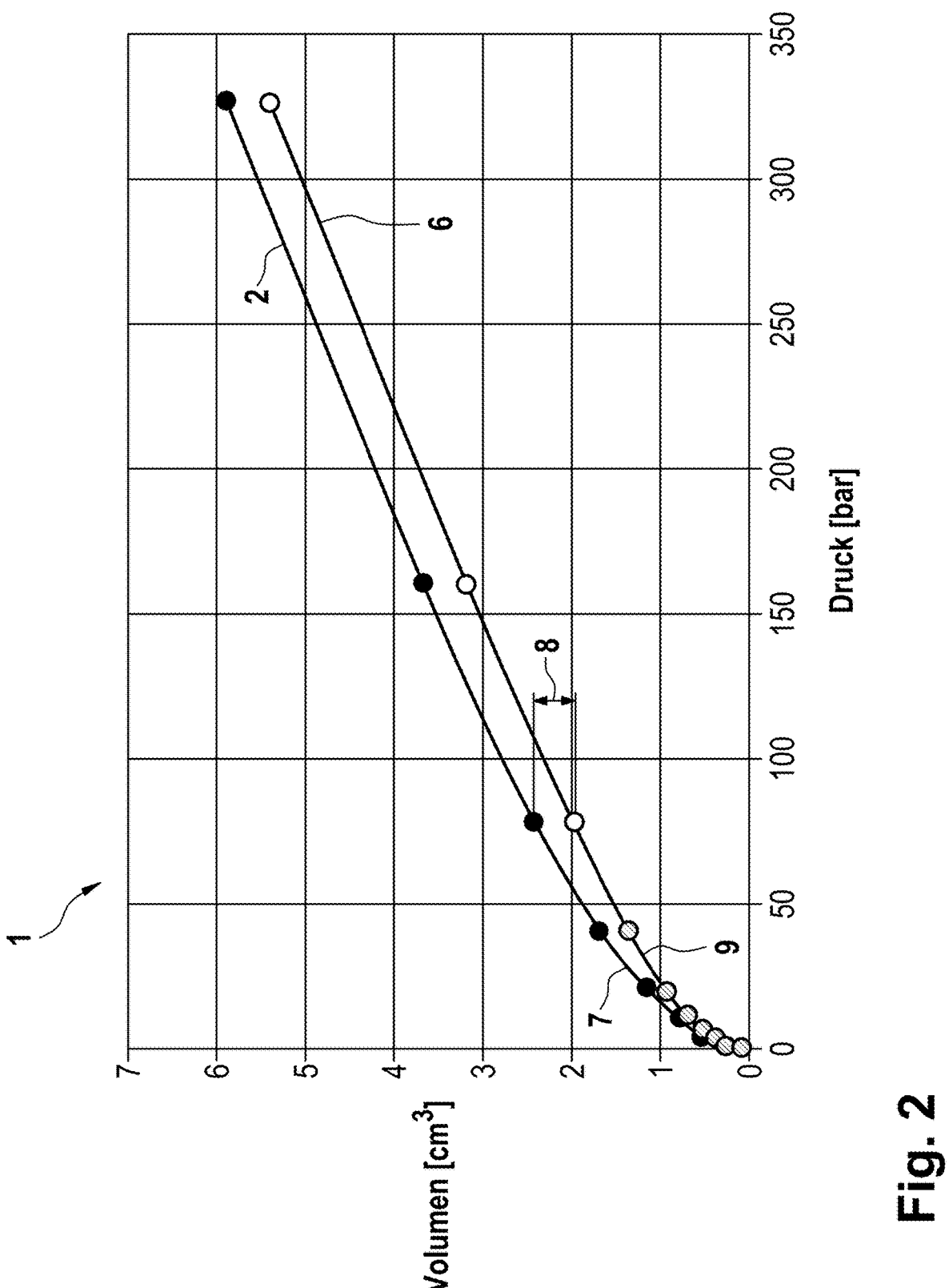
FIG. 2 shows an estimation of a pressure-volume characteristic curve.

In FIG. 2, the estimation of the auxiliary pressure-volume data pairs 4, 5 is illustrated in detail. The following property of the brake caliper of the brake caliper device is utilized here. In a high pressure range (from about 80 bar), the pressure-volume characteristic curve 2 is almost exclusively determined by the influence of the "stiff" components of the brake caliper (material of the brake caliper housing). This results in an almost linear relationship of the pressure-volume characteristic curve 2 in these high pressure ranges. Therefore, if sensor data into the high pressure range are available, a linear extrapolation 6 of the volume interpolation values that are sought can take place at even higher pressures (for which no measurement data are available) because of the linear relationship.

The estimation is performed for the low pressure range by means of a parallel displacement. This is because in the low pressure range (up to about 80 bar) the influence of the "soft" components of the brake caliper (seals, brake lining, and the like) prevails. This results in a non-linear relationship for the pressure-volume characteristic curve 2 in this low pressure range; the influences of the soft and the stiff components of the brake caliper are overlaid. Therefore, if only measurement data of the sensor device in the low pressure range are available, these measurement data cannot simply be extrapolated because of the non-linear relationship. However, in this range there may be data already measured from earlier measurements by means of the sensor device (for example in a previous calibration), which form an auxiliary pressure-volume characteristic curve 7 in this range. This auxiliary pressure-volume characteristic curve 7 can then be used in the estimation and displaced parallel by a suitable volume difference 8 to the required data pairs. This allows an adapted pressure-volume characteristic curve 9 to be determined at low pressures and adapted to the wear of the brake caliper device even during operation of the brake caliper device.

Although the present disclosure has been illustrated and described in detail, it is not limited by the disclosed examples.

LIST OF REFERENCE SIGNS

1 Pressure-volume diagram
2 Pressure-volume characteristic curve
3 Pressure-volume data pair
4 Auxiliary pressure-volume data pairs
5 Auxiliary pressure-volume data pairs
6 Linear extrapolation
7 Auxiliary pressure-volume characteristic curve
8 Volume difference
9 Adapted pressure-volume characteristic curve

The invention claimed is:

1. A method for determining a pressure-volume characteristic curve of a brake caliper device, wherein the pressure-volume characteristic curve is formed from a number of pressure-volume data pairs, wherein in each pressure-vol-ume data pair a pressure interpolation value is assigned to a volume interpolation value, wherein the volume interpolation value is determined by a compensation calculation on a number of predefined auxiliary pressure-volume data pairs.

2. The method as claimed in claim 1, wherein the auxiliary pressure-volume data pairs in a local vicinity of the pressure interpolation value assigned to the volume interpolation value have auxiliary pressure interpolation values that are less than and/or greater than the assigned pressure interpolation value.

3. The method as claimed in claim 2, wherein the compensation calculation utilizes the method of least squares to determine a regression function on the auxiliary pressure-volume data pairs that indicates the volume as a function of the pressure in the local vicinity.

4. The method as claimed in claim 3, wherein the volume interpolation value is determined as a function value of the regression function at the location of the assigned pressure interpolation value.

5. The method as claimed in claim 1, wherein the auxiliary pressure-volume data pairs are determined by estimation.

6. The method as claimed in claim 5, wherein the estimation is carried out in a linear region of the pressure-volume characteristic curve by an extrapolation of a number of auxiliary pressure-volume data pairs measured in the linear region.

7. The method as claimed in claim 5, wherein the estimation is carried out in a non-linear region of the pressure-volume characteristic curve by a parallel displacement of an auxiliary pressure-volume characteristic curve from a number of auxiliary pressure-volume data pairs measured in the non-linear region.

8. The method as claimed in claim 1, wherein the pressure-volume characteristic curve is determined in such a way that it has a strictly monotonously increasing progression, and/or a concave progression, and/or that its derivation has only one maximum in the entire range of the pressure interpolation values.

9. The method as claimed in claim 1, wherein the determination of the pressure-volume characteristic curve is carried out during the operation of the brake caliper device and is used to compensate for wear effects of the brake caliper device.

10. The method as claimed in claim 1, wherein the auxiliary pressure-volume data pairs are measured by a sensor device on the brake caliper device.

\* \* \* \* \*